(12) United States Patent
Lindgren et al.

(10) Patent No.: US 11,727,590 B2
(45) Date of Patent: Aug. 15, 2023

(54) VISION SYSTEM AND METHOD FOR A MOTOR VEHICLE

(71) Applicant: Arriver Software AB, Linkoping (SE)

(72) Inventors: Leif Lindgren, Linköping (SE); Fredrik Medley, Linköping (SE)

(73) Assignee: Arriver Software AB, Linkoping (SE)

( * ) Notice: Subject to any disclaimer, the term of this patent is extended or adjusted under 35 U.S.C. 154(b) by 0 days.

(21) Appl. No.: 16/334,863

(22) PCT Filed: Sep. 20, 2017

(86) PCT No.: PCT/EP2017/073792
§ 371 (c)(1),
(2) Date: Mar. 20, 2019

(87) PCT Pub. No.: WO2018/054981
PCT Pub. Date: Mar. 29, 2018

(65) Prior Publication Data
US 2019/0279385 A1    Sep. 12, 2019

(30) Foreign Application Priority Data

Sep. 21, 2016    (EP) .................................... 16189913

(51) Int. Cl.
*G06T 7/593*    (2017.01)
*G06T 1/20*    (2006.01)
(Continued)

(52) U.S. Cl.
CPC ................ *G06T 7/593* (2017.01); *G06T 1/20* (2013.01); *G06T 3/20* (2013.01); *G06T 3/40* (2013.01);
(Continued)

(58) Field of Classification Search
None
See application file for complete search history.

(56) References Cited

U.S. PATENT DOCUMENTS 7,003,143 B1 * 2/2006 Hewitt ............... G06K 9/00134
250/201.3
8,233,660 B2    7/2012 Fritsch et al.
(Continued)

FOREIGN PATENT DOCUMENTS

| EP | 1 681 577 A2 | 7/2006 |
| EP | 2 219 133 A1 | 8/2010 |
| EP | 2 381 416 A1 | 10/2011 |

OTHER PUBLICATIONS

International Search Report and Written Opinion of PCT/EP2017/073792 dated Dec. 7, 2017.
(Continued)

*Primary Examiner* — Hung Q Dang
(74) *Attorney, Agent, or Firm* — Arriver Software AB

(57) ABSTRACT

A vision system (10) for a motor vehicle includes a stereo imaging apparatus (11) adapted to capture images from a surrounding of the motor vehicle, a disparity calculation block (17) adapted to calculate a stereo disparity of left/right images captured by the stereo imaging apparatus (11), and a processing device (14) adapted to perform image processing of images captured by the imaging apparatus (11). The vision system is adapted to perform time sharing of the disparity calculation block (17) between the stereo disparity calculation and calculation of a one-dimensional optical flow of captured images in a horizontal direction only.

20 Claims, 3 Drawing Sheets

(51) Int. Cl.
*G06T 3/20* (2006.01)
*G06T 3/40* (2006.01)
*G06T 7/20* (2017.01)
*G06T 7/269* (2017.01)
*G06T 7/70* (2017.01)
*G08G 1/16* (2006.01)
*H04N 13/239* (2018.01)
*H04N 13/00* (2018.01)

(52) U.S. Cl.
CPC ............... *G06T 7/20* (2013.01); *G06T 7/269* (2017.01); *G06T 7/70* (2017.01); *G08G 1/166* (2013.01); *H04N 13/239* (2018.05); *G06T 2207/10021* (2013.01); *G06T 2207/20068* (2013.01); *G06T 2207/20228* (2013.01); *G06T 2207/30252* (2013.01); *G08G 1/16* (2013.01); *H04N 2013/0081* (2013.01)

(56) References Cited

U.S. PATENT DOCUMENTS

| | | | |
|---|---|---|---|
| 8,797,417 B2 | 8/2014 | Gayko et al. | |
| 2008/0239097 A1* | 10/2008 | Izuhara | H04N 5/772 348/231.99 |
| 2010/0165128 A1* | 7/2010 | Lee | H04N 5/232 348/208.4 |
| 2010/0183192 A1 | 7/2010 | Fritsch et al. | |
| 2011/0175904 A1* | 7/2011 | van Baar | H04N 13/122 345/419 |
| 2012/0127269 A1* | 5/2012 | Wang | H04N 13/183 348/43 |
| 2016/0261848 A1* | 9/2016 | Sekiguchi | G06K 9/6215 |
| 2017/0201736 A1* | 7/2017 | Ishimaru | G01C 3/06 |
| 2017/0291550 A1* | 10/2017 | Sasaguchi | B60R 1/00 |
| 2019/0023223 A1* | 1/2019 | Yoo | B60R 25/043 |

OTHER PUBLICATIONS

Appiah, Naveen, et al., "Obstacle detection using stereo vision for self-driving cars", May 11, 2016 (May 11, 2016), pp. 1-7, XP055360540, Retrieved from the Internet: URL:https://web.stanford.edu/class/ee368/Project_Autumn_1516/Reports/Appiah_Bandaru.pdf [retrieved on Mar. 30, 2017] abstract, Subsection B, Disparity estimation; p. 2-p. 3; Figure 4; Subsection C. Depth estimation; p. 3.

Honegger, Dominik, et al., "Real-Time Velocity Estimation Based on Optical Flow and Disparity Matching", Intelligent Robots and Systems (IROS), 2012 IEEE/RSJ International Conference On, IEEE, Oct. 7, 2012 (Oct. 7, 2012), pp. 5177-5182, XP032287376, DOI: 10.1109/IROS.2012.6385530 ISBN: 978-1-4673-1737-5 abstract, Section III. System Setup; p. 5178-p. 5179; Figure 1, Section IV. FPGA Architecture; p. 5179-p. 5180.

Ancona, Nicola, et al., "Optical Flow From 1-D Correlation: Application to a Simple Time-To-Crash Detector", International Journal of Computer Vision, Kluwer Academic Publishers, Norwell, US, vol. 14, No. 2, Mar. 1, 1995 (Mar. 10, 1995), pp. 131-146, XP000495898, ISSN: 0920-5691, DOI: 10.1007/BF01418979 abstract Section 2 Computing the Optical Flow Along a Direction; p. 131-p. 133; Section 5 Conclusions; p. 144.

De Micheli, et al., "The accuracy of the computation of optical flow and of the recovery of motion parameters," IEEE Transations on Pattern Analysis and Machine Intelligence, vol. 15, No. 5, May 1, 1993 (May 1, 1993), pp. 434-447, XP055005307.

* cited by examiner

FIG. 3
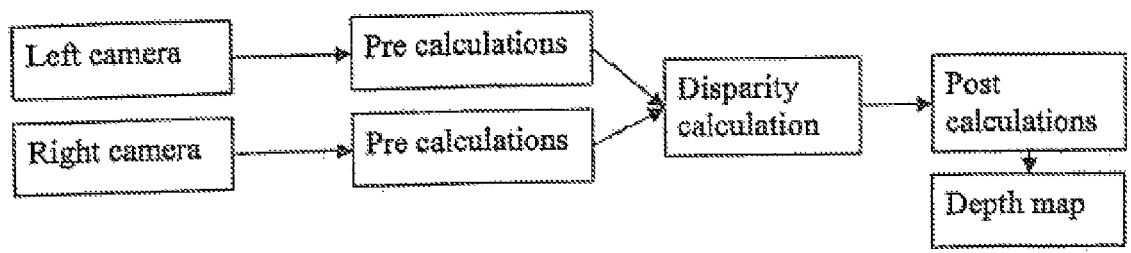
FIG. 4
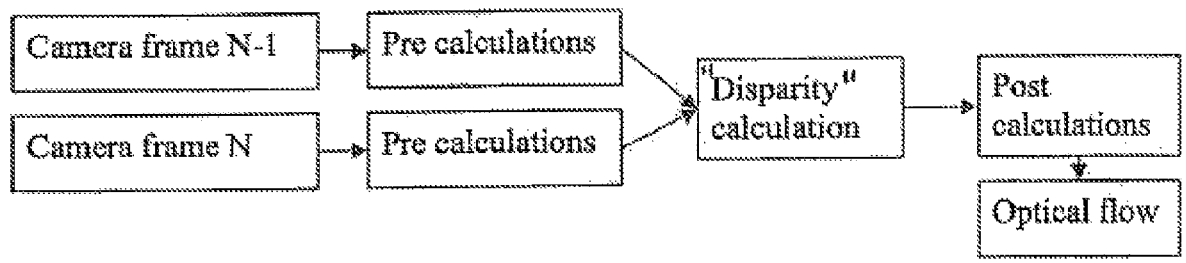
FIG. 5
| Frame No. | 1 | 2 | 3 | 4 | 5 | 6 |
|---|---|---|---|---|---|---|
| Exposure level | Level A | Level B | Level A | Level C | Level A | Level B |
| Left camera | $L_1$ | $L_2$ | $L_3$ | $L_4$ | $L_5$ | $L_6$ |
| Right camera | $R_1$ | $R_2$ | $R_3$ | $R_4$ | $R_5$ | $R_6$ |
| Memory area 26 | | | | | | |
| Memory area 27 | | | | | | |
| Disparity calculation | Stereo | Optical flow | Stereo | Optical flow | Stereo | Optical flow |

VISION SYSTEM AND METHOD FOR A MOTOR VEHICLE

CROSS-REFERENCE TO RELATED APPLICATIONS

This application is a 35 U.S.C. § 371 national phase of PCT International Application No. PCT/EP2017/073792, filed Sep. 20, 2017, which claims the benefit of priority under 35 U.S.C. § 119 to European Patent Application No. 16189913.3, filed Sep. 21, 2016, the contents of which are incorporated herein by reference in their entirety.

FIELD OF THE INVENTION

The invention relates to a vision system for a motor vehicle, including a stereo imaging apparatus adapted to capture images from a surrounding of the motor vehicle, a disparity calculation block adapted to calculate a stereo disparity of left/right images captured by the stereo imaging apparatus, and a processing device adapted to perform image processing of images captured by the imaging apparatus. The invention furthermore relates to a corresponding vision method.

BACKGROUND

Vision systems for motor vehicles are generally known, see for example EP 2 219 133 A1 and US 2010 183192 A1.

For a wide range of image processing procedures it would be beneficial to know the optical flow of the captured images. For example, EP 1 681 577 A2 proposes to determine the optical flow and use it for calculating the vanishing point of a captured image. However, the calculation of the optical flow is highly demanding with respect to processing and hardware resources. This has so far prohibited its realization in practical vision systems for motor vehicles under cost aspects.

The object of embodiments of the present invention is to provide a cost-effective, practical vision system and method for a motor vehicle suited for calculating an optical flow of captured images.

SUMMARY

Embodiments of the invention address the above-described object with the features of the devices and methods described herein. The invention has realized that under usual conditions, the optical flow in the horizontal direction provides a good approximation to the 2-dimensional optical flow, at least in the most important portion around the horizon in the image. The optical flow calculation in one direction can be performed with significantly less processing resources than the conventional optical flow in two dimensions, namely the horizontal and the vertical direction. Therefore, through the invention a cost-effective practical vision system for a motor vehicle supplying an optical flow of captured images in a good approximation can be realized.

According to embodiments of the invention time sharing of the disparity calculation block between the stereo disparity calculation and the optical flow calculation is performed. Embodiments of the invention in so far has realized that the horizontal motion or horizontal optical flow can be estimated using correlation search in the horizontal direction, and this is what is usually done in the disparity calculation in the stereo calculation block of the stereo imaging system where the baseline direction is approximately horizontal. In other words, the optical flow calculation uses the algorithm of the stereo disparity calculation in the disparity calculation block. Therefore, the stereo code can advantageously be used both for the stereo disparity calculation and the optical flow calculation, with only minor adaptations. For example, the system is preferably adapted to shift one image horizontally before the optical flow calculation, because the stereo disparity calculation can handle only positive horizontal motion but the horizontal shift will allow negative motion, as required for the optical flow calculation. Instead of shifting one of the images, the search range in the disparity calculation can be shifted before the optical flow calculation. For example, the disparity search engine could search e.g. 0 to 31 pixel disparity when calculating stereo, and search e.g. −16 to +15 pixel when calculating horizontal optical flow.

As described above, the horizontal optical flow calculation is performed by a correlation search on each line of consecutive images. In many mounting situations the horizontal direction can be approximated by the baseline direction, and the horizontal optical flow can be approximated by the optical flow in the baseline direction.

The stereo disparity calculation and the optical flow calculation can advantageously be performed in one and the same dedicated hardware device, for example a Field Programmable Gate Array (FPGA), adapted to perform both the stereo disparity calculation and the optical flow calculation. As a result, significant savings regarding computing and hardware resources are possible.

Several preferred features contribute to improving the quality of the optical flow calculation. In particular, the system preferably is adapted to perform a pitch correction by estimating a vertical displacement of captured images caused by pitch change of the vehicle, and to shift an image vertically before the optical flow calculation in order to compensate for changing pitch of the vehicle. The estimation of the vertical displacement of captured images caused by pitch can be done using standard methods based on image processing, or signals from vehicle dynamics sensors like accelerometers. The compensation is particularly applied in the optical flow calculation, because the pitch can change strongly from one frame to another when for example driving over speed bumps and the like.

Preferably the system is adapted to perform a compensation processing to a captured image in order to compensate for the movement of the vehicle along the road which leads to a vertical shift of the image from one frame to the next, which is particularly strong in the lower part of the image. A simple but effective method of realizing such compensation processing is based on removing or duplicating lines in the image. Other compensation methods are possible, for example affine transformation, i.e. scaling, rotation, translation or any other suited method. The vehicle movement compensation is preferably using the vehicle speed as measured for example by a vehicle speed sensor or calculated from image processing of images acquired by the imaging apparatus.

BRIEF DESCRIPTION OF THE DRAWINGS

Embodiments of the invention are illustrated on the basis of preferred embodiments with reference to the accompanying drawings, wherein

FIG. 3 shows a general scheme illustrating the stereo disparity calculation;

FIG. 4 shows a general scheme illustrating the horizontal optical flow calculation; and FIG. 5 shows a table illustrating the memory usage and calculation switching for an imaging apparatus using different exposure levels.

DETAILED DESCRIPTION

Figure 1:
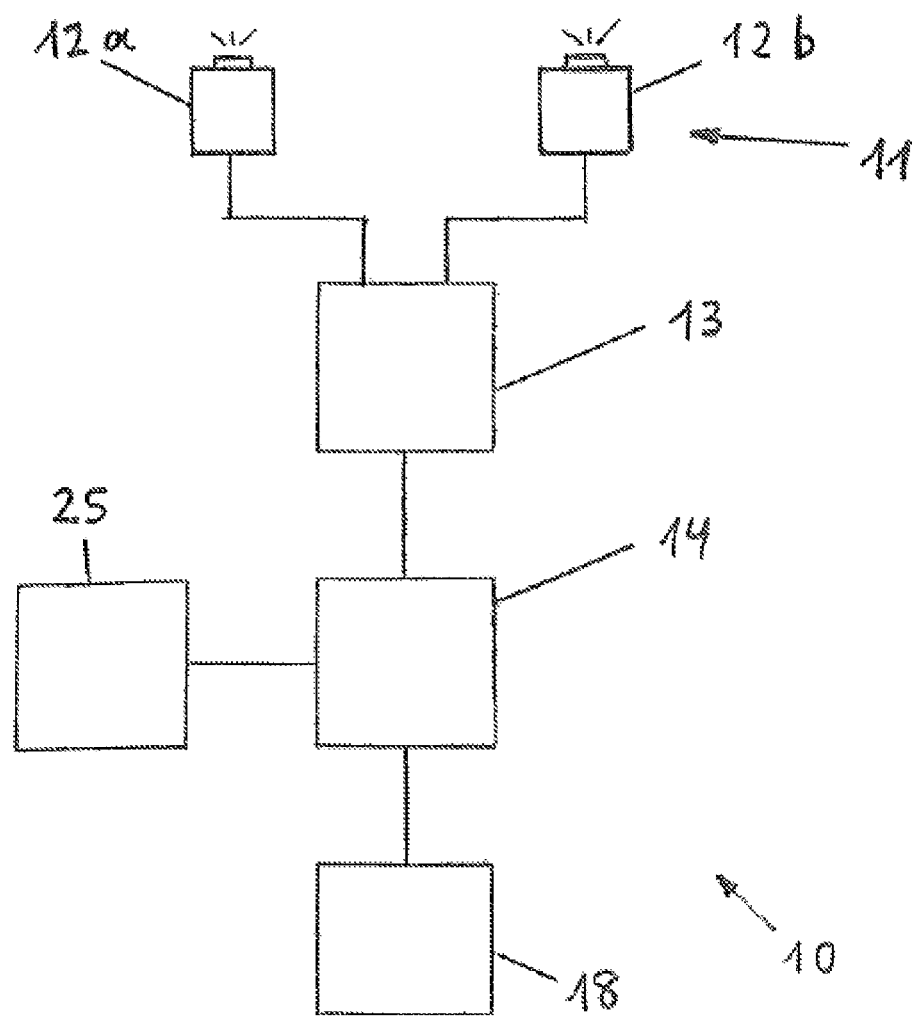
FIG. 1 shows a schematic view of a vision system for a motor vehicle.

The vision system 10 is mounted in a motor vehicle and includes an imaging apparatus 11 for capturing images of a region surrounding the motor vehicle, for example a region in front of the motor vehicle. The imaging apparatus 11 includes a plurality of optical imaging devices 12 forming a stereo imaging apparatus 11. Preferably the imaging devices 12 are cameras, operating in the visible and/or infrared wavelength range, where infrared covers near IR with wavelengths below 5 microns and/or far IR with wavelengths beyond 5 microns.

The imaging apparatus 11 is coupled to an image pre-processor 13 adapted to control the capture of images by the imaging apparatus 11, receive the electrical signal containing the image information from the imaging apparatus 11, rectify or warp pairs of left/right images into alignment and/or create disparity or depth images, which per se is known in the art. The pre-processor 13 in particular includes, or forms, the disparity calculation block 17 adapted to calculate the stereo disparity of left/right images captured by the imaging apparatus 11. The image pre-processor 13 may be realized by a dedicated hardware circuit, for example a Field Programmable Gate Array (FPGA) or an Application Specific Integrated Circuit (ASIC). Alternatively the pre-processor 13, or part of its functions, can be realized in the electronic processing device 14 or a System-On-Chip (SoC) device including, for example, FPGA, processing device, ARM and/or microprocessor functionality.

The pre-processed image data is then provided to an electronic processing device 14 where further image and data processing is carried out by corresponding software. The image and data processing in the processing device 14 may for example include identifying and preferably also classifying possible objects in front of the motor vehicle, such as pedestrians, other vehicles, bicyclists and/or large animals, tracking over time the position of object candidates identified in the captured images, and activating or controlling at least one driver assistance device 18 depending on an estimation performed with respect to a tracked object, for example an estimated collision probability. The driver assistance device 18 may in particular include a display device to display information relating to a detected object. However, the invention is not limited to a display device. The driver assistance device 18 may in addition or alternatively include a warning device adapted to provide a collision warning to the driver by suitable optical, acoustical and/or haptic warning signals; one or more restraint systems such as occupant airbags or seat belt tensioners, pedestrian airbags, hood lifters and the like; and/or dynamic vehicle control systems such as brake or steering control devices.

The electronic processing device 14 is preferably a digital device which is programmed or programmable and preferably includes a microprocessor, micro-controller, digital signal processor (processing device) or a System-On-Chip (SoC) device, and preferably has access to, or includes, a memory device 25. The electronic processing device 14, pre-processing device 13 and the memory device 25 are preferably realised in an on-board electronic control unit (ECU) and may be connected to the imaging apparatus 11 via a separate cable or a vehicle data bus. In another embodiment, the ECU and one or more of the imaging devices 12 can be integrated into a single unit, where a one box solution including the ECU and all imaging devices 12 can be preferred. All steps from imaging, image pre-processing, image processing to possible activation or control of driver assistance device 18 are performed automatically and continuously during driving in real time.

The pre-processing device 13, which here is a dedicated hardware device, for example an FPGA, includes a warping and alignment section 15, pre-calculation sections 16a, 16b for performing suited pre-calculations such as filtering, and a stereo disparity calculation block 17 for executing the stereo disparity code. Suitable post-calculations are executed on the output of the stereo disparity calculation block 17 in order to obtain a disparity map.

The memory device 25 includes data areas 26 and 27 for storing the image data of the (N−1)th or last-before-current time frame and the image data of the N-th or current time frame. This is different from many other vision systems where only the image data of the respective current time frame is stored in memory, but the image data of the last-before-current time frame is not kept in the system. The images stored in the memory device 25 need not be unprocessed raw image data, but preferably are processed images which in particular may have a reduced size as compared to the raw image data. The images stored in the memory device 25 may for example be warped images output by the warping and alignment section 15, pre-processed images output by the pre-calculation sections 16a, 16b, or images otherwise suitably modified and/or scaled. This allows to perform the optical flow calculation, to be explained later, on down-sampled images of reduced size which contributes to saving significant processing resources.

Figure 2:
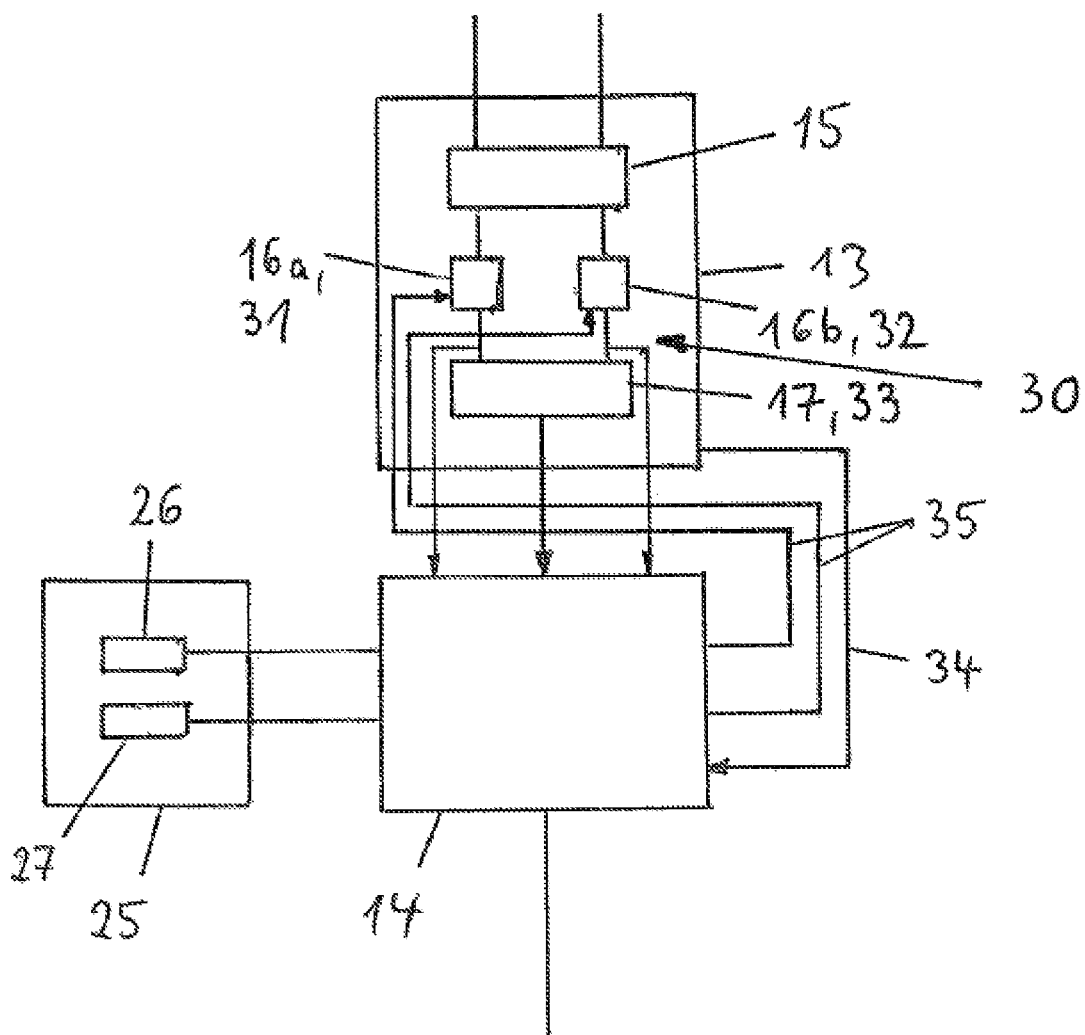
FIG. 2 shows a detailed schematic view of part of the vision system of FIG. 1 in one embodiment.

In the embodiment according to FIG. 2 the horizontal optical flow calculation is realized in one and the same dedicated hardware device as the stereo disparity calculation, namely in the pre-processing device 13. The vision system 10 in this embodiment includes an optical flow calculator 30 formed in the pre-processor 13. The optical flow calculator 30 preferably controls the processing device 14, in particular video ports thereof, via one or more control lines 34, to continuously read the image data of the (N−1)-th and N-th frames out from the memory device 25 and input them into the optical flow calculator 30 via data lines 35. That is, when the horizontal optical flow is to be calculated in the pre-processing device 13, the image data of the (N−1)-th and N-th frames are streamed back into the pre-processing device 13 through the data lines 35 as controlled by the pre-processing device 13 through the control line 34.

As mentioned above, preferably, down-sampled images of reduced size are streamed back into the optical flow calculator 30 for optical flow calculation which contributes to saving significant processing resources.

The optical flow calculator 30 includes pre-calculation sections 31, 32 for performing suitable pre-calculations on the image data of the (N−1)-th and N-th frames, respectively. This may include for example, as mentioned above, the horizontal shifting of one of the images; pitch correction; and/or compensation for movement of the vehicle in particular in the lower part of the image. The pre-calculation sections 31, 32 are preferably formed by the pre-calculation sections 16a, 16b in the pre-processor 13.

The horizontal optical flow calculator 30 furthermore includes an optical flow calculating section 33, which is formed by the stereo disparity calculation block 17. The horizontal optical flow calculating section 33 includes a code adapted to calculate the optical flow in the horizontal direction, only, of the captured images, but not in the vertical direction. The algorithm of the optical flow calculating section 33 is essentially the same as the algorithm used in the disparity calculation block 17, with a few advantageous adaptations as discussed above. The optical flow calculation is performed on down-sampled images of reduced size as compared to the raw image data, which contributes to saving significant processing resources. The output of the horizontal optical flow calculator 30 undergoes some suited post-calculations in order to obtain the final horizontal optical flow. These post-calculations may include for example the horizontal shift-back due to the image having been horizontally shifted in one of the pre-calculation sections 31, 32. This shift-back operation may for example be performed by a subtraction of a constant from the disparity value that corresponds to the shift in the pre-calculation.

Although it may be preferred for the horizontal optical flow calculator 30 to use the memory device 25 associated to the processing device 14 for storing the image data of the (N−1)-th and N-th frames, this is not strictly mandatory. In another embodiment of the invention not shown in the Figures, a separate memory for storing the image data of the (N−1)-th and N-th frames may be associated directly to the horizontal optical flow calculator 30, which may allow a quicker fetching of the image data from the memory.

In another preferred embodiment of the invention not shown in the Figures, the pre-calculation sections 31 and 32 may be realized in the processing device 14. The processing device 14 creates images where the above mentioned compensations have been performed, and then streams these data to the optical flow calculator 30 when the optical flow calculations are scheduled to take place. In this case, pre-processed images are streamed to the optical flow calculator 30 in at least one channel, preferably both channels.

The embodiment according to FIG. 2 is particularly advantageous in, but not restricted to, cases where different exposure levels are used in the imaging apparatus 11. For example, every second frame may use a normal exposure (exposure level A in FIG. 5) that produces images which can be used for the stereo disparity calculation. The other exposures (exposure levels B and C in FIG. 5), for example exposures adapted to low-light conditions at night, cannot be used for the stereo disparity calculation and therefore the electronic processing device 13 would be idling during these periods. However, these periods may be used advantageously for the horizontal optical flow calculation. Therefore, by periodically switching between stereo disparity calculation and horizontal optical flow calculation the capacity of the hardware device 13 is fully utilized and no additional dedicated hardware device is required.

This method is explained in more detail with reference to FIG. 5. For the images in frame No. 1 the stereo disparity calculation is performed and the image of a specific imaging device, here left camera 12*a*, is stored for example in memory area 26 (see FIG. 2). For the images in frame No. 2 the stereo disparity calculation cannot performed, so there is time for calculating the horizontal optical flow for the current exposure level A frame fetched from memory area 26 and the last-before-current exposure level A frame (two frames before frame no. 1) fetched from the data memory area 27. For the images in frame No. 3 the stereo disparity calculation is performed and the image of the left camera 12*a* is stored in memory area 27, thereby overwriting the old data in data memory area 27 which are no longer needed. For the images in frame No. 4 the stereo disparity calculation cannot performed, so there is time for calculating the horizontal optical flow for the current level A frame no. 3 fetched from memory area 27 and the last-before-current level A frame no. 1 fetched from memory area 26, and so on.

From FIG. 5 it is apparent that the terms "N-th frame" and "(N−1)th" frame are not restricted to ultimately subsequent frames and ultimately current and ultimately last-before-current frames, but subsequent, current and last-before-current frames of same exposure level or, more generally, subsequent, current and last-before-current frames used for horizontal optical flow calculation.

According to another embodiment of the invention, the time between the two frames may be longer when the vehicle drives slower.

In FIGS. 3 and 4, the general scheme of stereo disparity calculation (FIG. 3) and horizontal optical flow calculation (FIG. 4) is shown without reference to a specific hardware implementation. In FIG. 4, the "Disparity" calculation has been set in apostrophes indicating that essentially the disparity calculation algorithm of FIG. 3 may be used for the horizontal optical flow calculation.

While the above description constitutes the preferred embodiment of the present invention, it will be appreciated that the invention is susceptible to modification, variation and change without departing from the proper scope and fair meaning of the accompanying claims.

The invention claimed is:

1. A vision system for a motor vehicle, comprising:
a stereo imaging apparatus adapted to capture images from a surrounding of the motor vehicle;
a memory device, wherein left and right images of at least a current time frame and a last before current time frame are simultaneously stored in the memory device for a calculation of an optical flow;
a pre-processing section comprising a dedicated hardware device including a disparity calculation block adapted to calculate a stereo disparity of left and right images captured by the stereo imaging apparatus producing a two-dimensional optical flow;
the dedicated hardware device of the pre-processing section further including an optical flow calculator adapted to control a video port of said processing device via one or more control lines and to continuously read image data representing the left and right images of the current time frame and the last before current time frame from the memory device via data lines;
wherein the pre-processing section is adapted to:
perform time sharing of the disparity calculation block between the stereo disparity calculation of the left and right images and a calculation of a one dimensional optical flow of the left and right images of the current time frame and the left and right images of the last before current time frame in only a positive horizontal direction providing an approximation of the stereo disparity for the two-dimensional optical flow; and
transform a motion in a negative horizontal direction into a motion in the positive horizontal direction by shifting one of the captured images or by shifting a range of pixels to be searched by the disparity calculation block, and providing the shifted one of the captured images or the range of pixels to be searched to the disparity calculation block for the calculation of the one-dimensional optical flow of the captured images; and
a processing device adapted to perform further image processing of the images captured by the imaging apparatus, the further image processing including identifying an object candidate in front of the motor vehicle, tracking a position of the object candidate over time, and activating or controlling at least one driver assistance device depending on an estimated probability of collision with the object candidate.

2. The vision system as claimed in claim 1 further comprising, the pre-processing section is adapted to perform the calculation of the disparity in the disparity calculation block, and forward an image data from the disparity calculation block to the processing device, and stream back the image data from the processing device to the disparity calculation block for the calculation of the optical flow.

3. The vision system as claimed in claim 1 further comprising, the pre-processing section is adapted to shift one of the captured images horizontally before the calculation of the optical flow.

4. The vision system as claimed in claim 1 further comprising, the pre-processing section is adapted to shift a search range in the calculation of the disparity before the calculation of the optical flow.

5. The vision system as claimed in claim 4, wherein the shift of the search range is a predetermined number of pixels.

6. The vision system as claimed in claim 5, wherein the predetermined number of pixels is at least 16 pixels.

7. The vision system as claimed in claim 4, wherein shifting the range of pixels to be searched includes shifting the range of pixels to be searched by a predetermined number of pixels.

8. The vision system as claimed in claim 1, wherein the images stored in the memory device for the calculation of the optical flow are pre-processed images of a reduced size as compared to a raw image taken by the imaging apparatus.

9. The vision system as claimed in claim 1 further comprising, the pre-processing section is adapted to estimate a vertical displacement of the images, and to shift an image vertically before the calculation of the optical flow in order to compensate for a changing pitch of the vehicle.

10. The vision system as claimed in claim 1 further comprising, the pre-processing section is adapted to perform a compensation processing of the images in order to compensate for a movement of the vehicle.

11. The vision system as claimed in claim 1 further comprising, a first time period between successive capture of the images by the stereo imaging apparatus is smaller when the vehicle is traveling at a relatively higher speed than a second time period between successive capture of images by the stereo imaging apparatus when the vehicle is traveling at a relatively lower speed.

12. The vision system as claimed in claim 1, wherein the processing device is adapted to shift back the one of the shifted captured images or the range of pixels to be searched.

13. A vision system for a motor vehicle, comprising:
a stereo imaging apparatus adapted to capture images from a surrounding of the motor vehicle,
a memory device, wherein left and right images of at least a current time frame and a last before current time frame are simultaneously stored in the memory device for a calculation of an optical flow;
a pre-processing section comprising a dedicated hardware device including a disparity calculation block adapted to calculate a stereo disparity of left and right images captured by the stereo imaging apparatus producing a two-dimensional optical flow, the dedicated hardware device comprising a Field Programmable Gate Array (FPGA), or an Application Specific Integrated Circuit (ASIC), or the dedicated hardware device being a part of a System-onChip (SoC) device;
the dedicated hardware device of the pre-processing section further including an optical flow calculator adapted to control a video port of said processing device via one or more control lines and to continuously read image data representing the left and right images of the current time frame and the last before current time frame from the memory device via data lines;
wherein the pre-processing section is adapted to:
perform time sharing of the disparity calculation block between the stereo disparity calculation of the left and right images and a calculation of a one dimensional optical flow of the left and right images of the current time frame and the left and right images of the last before current time in only a positive horizontal direction providing an approximation of the stereo disparity for the two-dimensional optical flow; and
transform a motion in a negative horizontal direction into a motion in the positive horizontal direction by shifting one of the captured images or by shifting a range of pixels to be searched by the disparity calculation block, and providing the shifted one of the captured images or the range of pixels to be searched to the disparity calculation block for the calculation of the one-dimensional optical flow of the captured images; and
a processing device adapted to perform further image processing of the images captured by the imaging apparatus, the further image processing including identifying an object candidate in front of the motor vehicle, tracking a position of the object candidate.

14. The vision system as claimed in claim 13 further comprising, the hardware device is adapted to use a memory device of the processing device.

15. The vision system as claimed in claim 13, wherein the vision system is adapted to shift one of the captured images horizontally before the calculation of the optical flow.

16. The vision system as claimed in claim 13, wherein the vision system is adapted to shift a search range in the calculation of the disparity before the calculation of the optical flow.

17. The vision system as claimed in claim 16, wherein the shift of the search range is a predetermined number of pixels.

18. A vision method for a motor vehicle, comprising:
capturing, by a stereo imaging apparatus, images from a surrounding of the motor vehicle;
storing the images of a current time frame and a last before current time frame simultaneously in a memory device;
calculating in a disparity calculation block, a stereo disparity of left and right images captured by the stereo imaging apparatus
producing a two-dimensional optical flow;
performing a time sharing of the disparity calculation block between the stereo disparity of the left and right images and an optical flow calculation of a one-dimensional optical flow of the left and right images of the current time frame and the left and right images of the last before current time only in a positive horizontal direction providing an approximation of the stereo disparity for the two-dimensional optical flow;
transforming a motion in a negative horizontal direction into a motion in the positive horizontal direction by shifting one of the captured images or by shifting a range of pixels to be searched by the disparity calculation block, and providing the shifted one of the captured images or the range of pixels to be searched to the disparity calculation block for the calculation of the one-dimensional optical flow of the captured images;

controlling, using an optical flow calculator formed in a pre-processing device, a video port of the processing device via one or more control lines; and continuously reading the images of the current time frame and the last before current time frame from the memory device into the optical flow calculator via data lines, wherein the disparity calculation block is realized in the pre-processing device being a dedicated hardware device; and performing an image processing of the captured images, the image processing including identifying possible objects in front of the motor vehicle, tracking a position of the object candidate over time, and activating or controlling at least one driver assistance device depending on an estimated probability of collision with the object candidate.

19. The method of claim 18, further comprising shifting one of the captured images horizontally before producing the two-dimensional optical flow.

20. The method of claim 18, further comprising shifting the range of pixels to be searched by the disparity calculation block before producing the two-dimensional optical flow.

* * * * *